(12) United States Patent
Fouche

(10) Patent No.: US 6,751,529 B1
(45) Date of Patent: Jun. 15, 2004

(54) SYSTEM AND METHOD FOR CONTROLLING MODEL AIRCRAFT

(75) Inventor: J. Michael Fouche, Huntsville, AL (US)

(73) Assignee: Neural Robotics, Inc., Huntsville, AL (US)

( * ) Notice: Subject to any disclaimer, the term of this patent is extended or adjusted under 35 U.S.C. 154(b) by 0 days.

(21) Appl. No.: 10/449,372

(22) Filed: May 30, 2003

Related U.S. Application Data

(60) Provisional application No. 60/385,315, filed on Jun. 3, 2002.

(51) Int. Cl.$^7$ .............................................. B64C 11/34
(52) U.S. Cl. .......................... 701/3; 244/3.21; 244/164; 244/171; 342/29; 340/967
(58) Field of Search ............................. 701/3, 4, 7, 48; 244/3.21, 164, 171, 181, 183, 158 R, 177, 179; 342/29, 30; 340/967, 975, 978

(56) References Cited

U.S. PATENT DOCUMENTS

| | | | |
|---|---|---|---|
| 5,553,812 A | * 9/1996 | Gold et al. ................ | 244/76 R |
| 5,797,105 A | * 8/1998 | Nakaya et al. .................. | 701/7 |
| 5,841,537 A | * 11/1998 | Doty ........................... | 356/484 |
| 6,092,919 A | 7/2000 | Calise et al. | |
| 6,473,676 B2 | * 10/2002 | Katz et al. ...................... | 701/4 |

OTHER PUBLICATIONS

Buschek, H.; Calise, A.J., "µ Controllers: Mixed and Fixed", *AIAA J. of Guidance, Control, and Dynamics*, vol. 20, No. 1, pp. 34–41, 1997.

Robinson, Rick, "Better than Human Flight Control Systems", *Research Horizons*, Winter 2000, found at http://gtresearchnews.gatech.edu/reshor/rh-win00/flight.html.

Sugeno, Michio, "Demostration of Unmanned Helicopter with Fuzzy Control", 1993, found at http://www.cs.arizona.edu/japan/www/atip/public/atip.reports.95/atip95.13r.html.

Sugeno, Michio, "Fuzzy Logic Controller in an Intelligent, Unmanned Helicopter", 1995, found at http://www.cs.arizona.edu/japan/www/atip/public/atip.reports.94/sugeno.94.html.

Bluck, John, "NASA Testing New Aircraft Safety Flight Control Software", Release 99–21AR, Apr. 14, 1999, found at http://amesnews.arc.nasa.gov/releases/1999/99 21 AR.html.

(List continued on next page.)

*Primary Examiner*—Thomas G Black
*Assistant Examiner*—Tuan C To
(74) *Attorney, Agent, or Firm*—Lanier Ford Shaver & Payne P.C.

(57) ABSTRACT

In one embodiment, a method for controlling an aircraft comprises providing an attitude error as a first input into a neural controller and an attitude rate as a second input into the neural controller. The attitude error is calculated from a commanded attitude and a current measured attitude, and the attitude rate is derived from the current measured attitude. The method also comprises processing the first input and the second input to generate a commanded servo actuator rate as an output of the neural controller. The method further comprises generating a commanded actuator position from the commanded servo actuator rate and a current servo position, and inputting the commanded actuator position to a servo motor configured to drive an attitude actuator to the commanded actuator position. The neural controller is developed from a neural network, wherein the neural network is designed without using conventional control laws, and the neural network is trained to eliminate the attitude error.

28 Claims, 16 Drawing Sheets

OTHER PUBLICATIONS

Saeks, Richard, LoFlyte information found at http://www.accurate-automation.com/Technology/Loflyte/loflyte.html.

Rolf, Rysdyk T.; Calise, A.J., "Nonlinear Adaptive Flight Control Using Neural Networks", *IEEE Controls Systems Magazine,* vol. 18, No. 6, Dec. 1998.

Leitner, Jesse; Calise, Anthony J.; Prasad, J.V.R., "Analysis of Adaptive Neural Networks for Helicopter Flight Controls", *AIAA Journal of Guidance, Control, and Dynamics,* vol. 20, No. 5, p. 972–979, Sep.–Oct. 1997.

* cited by examiner (Front View)

(Side View)

| Time (units) | INPUT TRAINING SET | | | OUTPUT TRAINING SET |
|---|---|---|---|---|
| | lower performance shaping line | roll attitude | upper performance shaping line | roll attitude rate | commanded servo actuator rate |
| 1 | -0.534 | 0.534 | 0.534 | -0.031 | -0.539 |
| 2 | -0.529 | 0.517 | 0.529 | -0.043 | -0.523 |
| 3 | -0.523 | 0.497 | 0.523 | -0.053 | -0.492 |
| 4 | -0.517 | 0.472 | 0.517 | -0.063 | -0.449 |
| 5 | -0.511 | 0.444 | 0.511 | -0.072 | -0.395 |
| 6 | -0.505 | 0.414 | 0.505 | -0.080 | -0.333 |
| 7 | -0.499 | 0.380 | 0.499 | -0.086 | -0.265 |
| 8 | -0.493 | 0.345 | 0.493 | -0.092 | -0.193 |
| 9 | -0.488 | 0.308 | 0.488 | -0.096 | -0.120 |
| 10 | -0.482 | 0.271 | 0.482 | -0.099 | -0.048 |
| 11 | -0.476 | 0.232 | 0.476 | -0.101 | 0.023 |
| 12 | -0.470 | 0.193 | 0.470 | -0.102 | 0.089 |
| . | | | | | . |
| . | | | | | . |
| 90 | -0.013 | 0.004 | 0.013 | -0.002 | 0.033 |
| 91 | -0.007 | 0.003 | 0.007 | -0.002 | 0.034 |
| 92 | -0.001 | 0.001 | 0.001 | -0.001 | 0.035 |
| 93 | 0.005 | 0.000 | -0.005 | 0.000 | 0.036 |

FIG. 15

| iterations | lower bound | upper bound | bias | neural network output |
|---|---|---|---|---|
| 1 | -40 | 40 | 0 | -0.1746216 |
| 2 | -40 | 0 | -20 | 3.2702389 |
| 3 | -20 | 0 | -10 | 1.4986907 |
| 4 | -10 | 0 | -5 | 0.5905902 |
| 5 | -5 | 0 | -2.5 | 0.1856542 |
| 6 | -2.5 | 0 | -1.25 | -0.0003075 |
| 7 | -2.5 | -1.25 | -1.875 | 0.0912329 |
| 8 | -1.875 | -1.25 | -1.5625 | 0.045101 |
| 9 | -1.5625 | -1.25 | -1.40625 | 0.0223054 |
| 10 | -1.40625 | -1.25 | -1.32812 | 0.0109756 |
| 11 | -1.32812 | -1.25 | -1.28906 | 0.0053279 |
| 12 | -1.28906 | -1.25 | -1.26953 | 0.0025086 |
| 13 | -1.26953 | -1.25 | -1.25977 | 0.0010999 |
| 14 | -1.25977 | -1.25 | -1.25488 | 0.0003963 |
| 15 | -1.25488 | -1.25 | -1.25244 | 0.0000436 |
| 16 | -1.25244 | -1.25 | -1.25122 | -0.0001315 |
| 17 | -1.25244 | -1.25122 | -1.25183 | -0.0000436 |
| 18 | -1.25244 | -1.25183 | -1.25214 | 0.0000002 |

FIG. 16

SYSTEM AND METHOD FOR CONTROLLING MODEL AIRCRAFT

RELATED APPLICATION

The application claims the benefit of priority under 35 U.S.C. § 119(c) of U.S. Provisional Application No. 60/385,315 filed on Jun. 3, 2002, the entirety of which is incorporated herein by reference.

BACKGROUND

1. Field

The present invention generally relates to aircraft control techniques and, in particular, to a system and method for controlling an aircraft via the use of a neural network controller.

2. Description of the Related Art

Aircraft generally have three ranges or axes of motion (roll, pitch, and yaw), and it is necessary to actively control the aircraft's motion about each of the three axes of motion via one or more aerodynamic actuators. In general, for fixed-wing aircraft (e.g., airplanes), roll, pitch, and yaw are primarily controlled via the aircraft's ailerons, horizontal stabilizer, and vertical stabilizer, respectively. For rotary-wing aircraft (e.g., helicopters), roll and pitch are generally controlled via the aircraft's main or horizontal rotor, and yaw is generally controlled via the aircraft's tail or vertical rotor. However, it is common for a particular actuator to contribute to more than one axis of motion, and it is possible for other types of actuators to be employed in addition to and/or in lieu of the aforementioned actuators.

Properly controlling an aircraft's motion can be a difficult task, particularly in environmental conditions (e.g., turbulence) that cause the aircraft to behave in an unpredictable manner. Indeed, most pilots spend an enormous amount of time and effort in learning how to properly control their aircraft.

Control of model aircraft (i.e., miniature, unmanned aircraft) adds an additional layer of difficulty since there is no on-board pilot that can apply the appropriate inputs for properly controlling the aircraft. A "pilot on the ground" cannot sense nuances in the aircraft movement and, thus, can become disoriented very quickly. For example, if a helicopter is facing away from a pilot (i.e., helicopter nose points in same direction as pilot's nose), then the pilot's left is the helicopter's left. But, if the helicopter yaws 180 degrees and faces the pilot, then the pilot has to change his/her orientation and method of thinking because "left is right" and "right is left." A pilot on board will never face this problem.

Rotary-wing model aircraft are inherently unstable in that they lack positive dynamic stability. With fixed-wing aircraft, their actuators can sometimes be positioned or configured such that the fixed-wing aircraft generally maintains stable flight without additional input from the actuators (also called trimmed flight). However, most rotary-wing aircraft fly in an unstable manner unless control inputs for the actuators are continuously provided. One drawback is the resulting difficulty of controlling a remote-controlled (RC) aircraft in flight.

For example, in order for a user to successfully fly and control a RC helicopter either for fun or business, the user has to be an expert pilot. In addition to having to know how to fly, the user also needs to know how to autorotate the RC helicopter in the event that the RC helicopter engine quits or stalls in mid air. The skills required to autorotate a helicopter is very different from the skills required to fly the helicopter. Even for RC fixed-wing aircraft, the user needs to know how to glide the aircraft to the ground.

SUMMARY

In one embodiment, a method for controlling an aircraft comprises providing an attitude error as a first input into a neural controller, the attitude error calculated from a commanded attitude and a current measured attitude, providing an attitude rate as a second input into a neural controller, the attitude rate derived from the current measured attitude, processing the first input and the second input to generate a commanded servo actuator rate as an output of the neural controller, generating a commanded actuator position from the commanded servo actuator rate and a current servo position, and inputting the commanded actuator position to a servo motor configured to drive an attitude actuator to the commanded actuator position, wherein, the neural controller is developed from a neural network, the neural network designed without using conventional control laws, the neural network trained to eliminate the attitude error.

In another embodiment, an apparatus for controlling an aircraft comprises an attitude sensor operable to provide a current attitude, a differentiator operable to receive as input the current attitude and derive an attitude rate, a neural controller operable to receive a plurality of inputs comprising an attitude error and the attitude rate, the attitude error calculated from a commanded attitude and the current attitude, the neural controller also operable to generate a commanded servo rate from the plurality of inputs, the commanded servo rate applied to a current actuator position to generate a commanded actuator position, and a servo motor operable receive the commanded actuator position, the servo motor further operable to drive an attitude actuator to the commanded actuator position, wherein the neural controller is developed from a neural network designed without using conventional control laws.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The following drawings incorporated in and forming a part of the specification illustrate, and together with the detailed description serve to explain various aspects of the implementation(s) and/or embodiment(s) of the invention and not of the invention itself.

FIG. 15 is a table illustrating an exemplary mapping between a plurality of input training sets for a RC model helicopter roll attitude and its corresponding commanded servo rate, according to the present invention.

FIG. 16 is a table illustrating exemplary chronological results of an iterative roll attitude error input bias calculation for a RC model helicopter, according to the present invention.

DETAILED DESCRIPTION

Figure 1A:
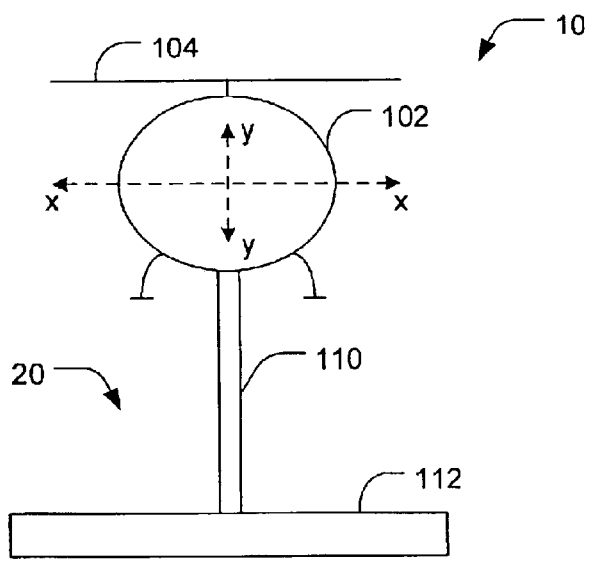
FIGS. 1A and 1B illustrate an exemplary RC model helicopter mounted to a 3-axis test stand suitable for control by a neural controller, according to one embodiment.

The various embodiments of the present invention and their advantages are best understood by referring to FIGS. 1 through 16 of the drawings. The elements of the drawings are not necessarily to scale, emphasis instead being placed upon clearly illustrating the principles of the invention. Throughout the drawings, like numerals are used for like and corresponding parts of the various drawings.

Turning first to the nomenclature of the specification, at least one embodiment described in the detailed description that follows is presented largely in terms of processes and symbolic representations of operations performed by computers, including computer components. A computer may be any microprocessor or processor (hereinafter referred to as processor) controlled device capable of enabling or performing the processes and functionality set forth herein. The computer may possess input devices such as, by way of example, a keyboard, a keypad, a mouse, a microphone, or a touch screen, and output devices such as a computer screen, printer, or a speaker. Additionally, the computer includes memory such as, without limitation, a memory storage device or an addressable storage medium.

The computer, and the computer memory, may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors (i.e., computers). The modules include, but are not limited to, software or hardware components that perform certain tasks.

Thus, a module may include, by way of example, components, such as, software components, processes, functions, subroutines, procedures, attributes, class components, task components, object-oriented software components, segments of program code, drivers, firmware, microcode, circuitry, data, and the like.

The program logic can be maintained or stored on a computer-readable storage medium. The term "computer-readable storage medium" refers to any medium that participates in providing the symbolic representations of operations to a processor for execution. Such media may take many forms, including, without limitation, volatile memory, nonvolatile memory, flash memory, electronic transmission media, and the like. Volatile memory includes, for example, dynamic memory and cache memory normally present in computers. Nonvolatile memory includes, for example, optical or magnetic disks.

It should also be understood that the programs, modules, processes, methods, and the like, described herein are but exemplary implementations and are not related, or limited, to any particular computer, apparatus, or computer language. Rather, various types of general-purpose computing machines or devices may be used with programs constructed in accordance with the teachings described herein. Similarly, it may prove advantageous to construct a specialized apparatus to perform some or all of the method steps described herein by way of dedicated computer systems with hard-wired logic or programs stored in non-volatile memory, such as, by way of example, read-only memory (ROM).

The present disclosure is generally directed to a system and corresponding methods that facilitate the control of aircraft in flight. In accordance with one embodiment of the present invention, a servo motor for moving one of the aircraft's actuators is given an open-loop stimulus (e.g., a sinusoidal control signal with exponentially decreasing amplitude) that causes the servo motor to move the actuator such that the aircraft oscillates at least once about one of the aircraft's axis of movement. During the oscillation, data indicative of the aircraft's response to the open-loop stimulus is captured. This data is then utilized to train a neural network used for controlling the aircraft's actuator.

More specifically, the data is utilized to train the neural network to control the actuator such that the actuator tends to return the aircraft to an equilibrium position when displaced from the equilibrium position. In other words, the neural network is trained to "zero-out" an attitude error (i.e., a displacement from the equilibrium position). Once the neural network is trained, it is implemented as a neural controller that is used to control the actuator during actual or test flight conditions. Based on the aircraft's flight performance, the neural controller is tuned by adjusting inputs to the neural controller such that the neural controller properly maintains the stability of the aircraft.

Even though the principles of the various embodiments of the invention described herein are suitable for controlling aircraft in general, for ease and clarity of explanation, the invention will be further disclosed in the context of controlling remote controlled (RC) aircraft. More particularly, a neural network and resulting neural controller suitable for controlling a RC model rotary-wing aircraft such as, by way of example, a helicopter, will be disclosed. It is appreciated that the principles of the invention disclosed herein in conjunction with the control of RC model helicopters may be utilized to control RC model fixed-wing aircraft as well as actual rotary and fixed-wing aircraft (i.e., non-model aircraft).

Figure 1B:
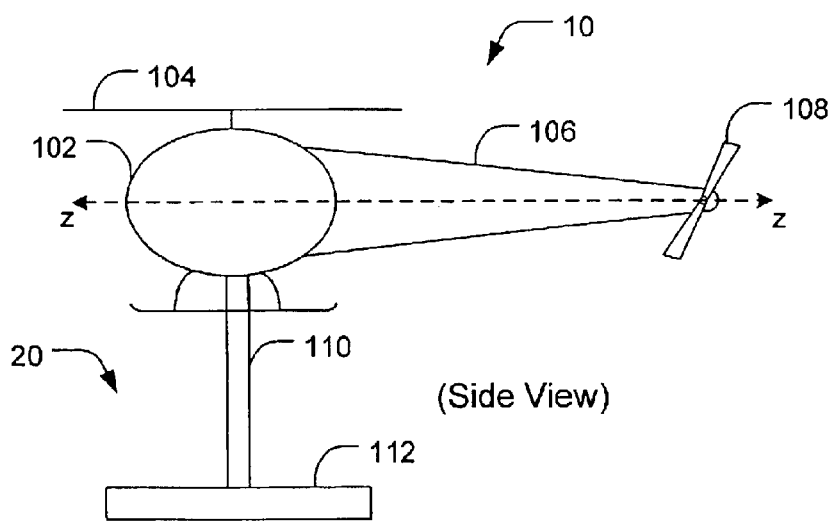

FIGS. 1A and 1B illustrate an exemplary RC model helicopter 10 mounted to a 3-axis test stand 20 suitable for control by a neural controller, according to one embodiment. As depicted, FIG. 1A illustrates a front view of RC model helicopter 10 mounted to test stand 20 (i.e., a holding mechanism) and FIG. 1B illustrates a side view of RC model helicopter 10 mounted to test stand 20. RC model helicopter 10 comprises a fuselage 102, a rotor 104 coupled to fuselage 102, a tail boom 106 coupled to fuselage 102, and a tail rotor 108 coupled to tail boom 106 substantially at a distal end opposite fuselage 102. As used herein, the terms "connected," "coupled," or any variant thereof, means any connection or coupling, either direct or indirect, between two or more elements; the coupling or connection between the elements can be physical, logical, or a combination thereof.

As depicted, rotor 104 generally functions to control roll (i.e., motion about the z-axis)-and pitch (i.e., motion about the x-axis), and tail rotor 108 generally functions to control yaw (i.e., motion about the y-axis). Rotor 104 is coupled to a rotor actuator (not shown) and tail rotor 108 is coupled to a tail rotor actuator (not shown). Each rotor is mechanically, electrically, or hydraulically coupled or linked to its respective actuator. A change in actuator position directly causes a change in the lateral position of its coupled rotor, which, in turn, affects the roll, pitch, and/or yaw attitude (i.e., the helicopter dynamics) of RC model helicopter 10. The x, y, and z-axes are indicated in FIGS. 1A and 1B by "dashed" lines and are not part of RC model helicopter 10.

Test stand 20 generally functions to hold RC model helicopter 10 and, more particularly, functions to enable RC model helicopter 10 to move about a single axis while prohibiting movement about the other two axes. Stated differently, RC model helicopter 10 can be mounted to test stand 20 and configured such that RC model helicopter 10 is free to move about a single axis of motion (e.g., about the x-axis) and unable to move about the other two axes of motion (e.g., about the y-axis and z-axis).

As depicted, test stand 20 comprises an arm 110 coupled to a base 112. Arm 110 generally extends from base 112 and functions to couple to RC model helicopter 10 at a distal end opposite the distal end coupled to base 112. In one embodiment, arm 110 is coupled to RC model helicopter 10 at the helicopter's center of gravity such that no movement is created by virtue of RC model helicopter 10 being coupled to test stand 20.

For example, to design a neural controller to control the z-axis (roll axis) of RC model helicopter 10, a user mounts RC model helicopter 10 to test stand 20 and enables movement only in the z-axis while locking-down or preventing movement about the x-axis (pitch axis) and the y-axis (yaw axis). The axis of interest (i.e., roll axis) is the only "free" axis, and the other two axes (i.e., the pitch and yaw axes) are locked-down.

Figure 2:
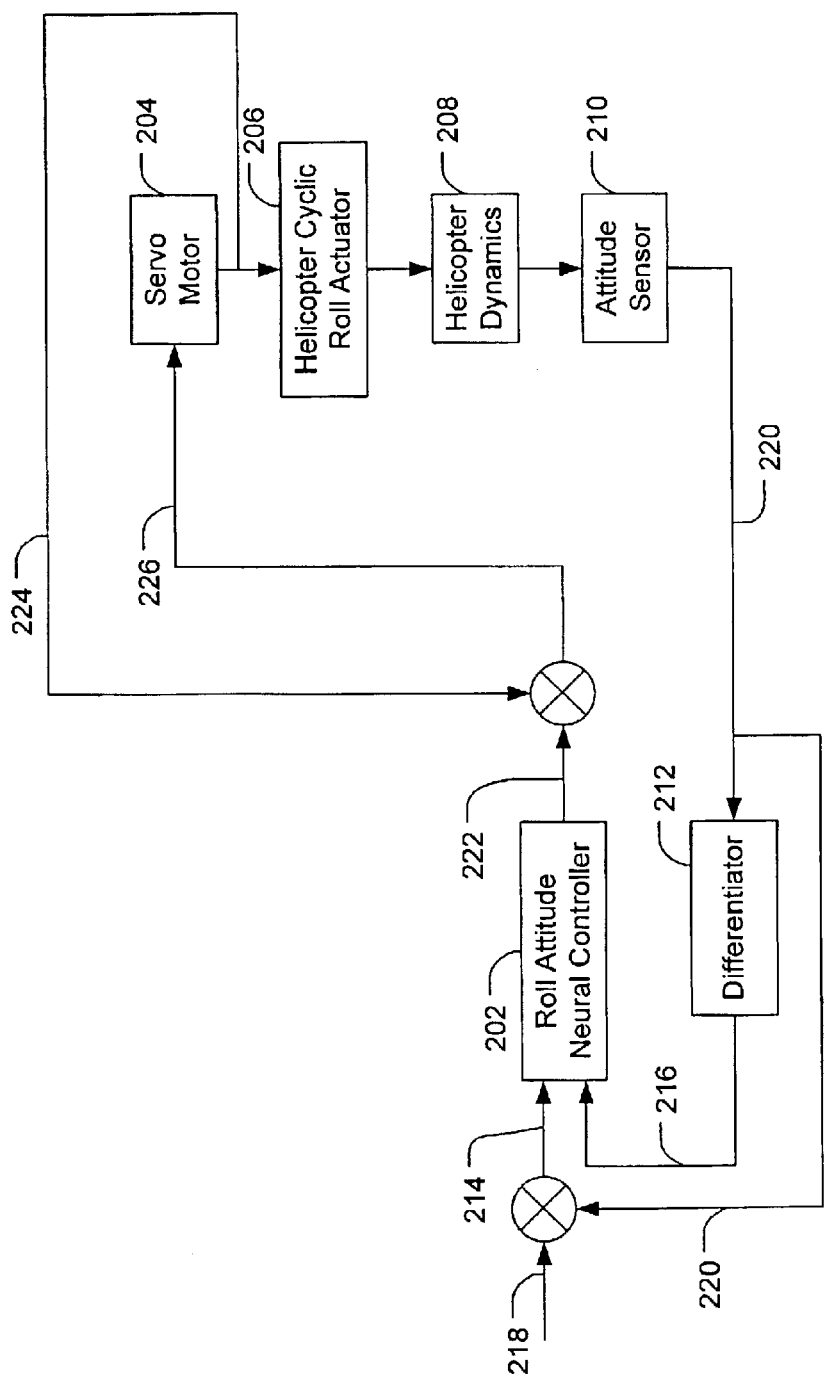
FIG. 2 illustrates a block diagram of one embodiment of a neural network roll attitude control, according to the present invention.

FIG. 2 illustrates a block diagram of one embodiment of a neural network roll attitude control, according to the present invention. The neural network roll attitude control generally functions to control the roll axis of RC model helicopter 10. As depicted, the neural network roll attitude control block diagram comprises a roll attitude neural controller 202, a servo motor 204, a helicopter cyclic roll actuator 206, a helicopter dynamics 208, an attitude sensor 210, and a differentiator 212.

Roll attitude neural controller 202 generally functions to control or maintain RC model helicopter 10 in a commanded roll attitude. In one embodiment, roll attitude neural controller 202 is a software implementation of a plurality of equations that define a neural network that is taught to reduce the roll attitude error to zero. Stated another way, the neural network is trained to control the roll actuator of RC model helicopter 10 such that the angular displacements of RC model helicopter 10 about the roll axis are "zeroed out." Designing and teaching a neural network suitable for use in designing roll attitude neural controller 202 is further discussed below.

Roll attitude neural controller 202 receives as input a roll attitude error 214 and a roll attitude rate 216. Roll attitude error 214 is the difference between a commanded roll attitude 218 and a measured (actual) roll attitude 220, and roll attitude rate 216 is the derivative of measured roll attitude 220. Roll attitude neural controller 202 processes the inputs and generates a servo actuator rate command 222, which is an incremental delta position (negative or positive) that is applied to a current actuator position 224 to generate a commanded actuator position 226 to servo motor 204.

In one embodiment, servo actuator rate command 222 is multiplied by a delta-time value (rate*delta-time), and the resulting value is added to current actuator position 224 (old position) to generate commanded actuator position 226 (a new position). Stated another way, a new position=old position+(rate*delta-time). The new position command is then sent to servo motor 204.

Servo motor 204 is coupled to helicopter cyclic roll actuator 206 and generally functions to drive helicopter cyclic roll actuator 206. Servo motor 204 receives as input commanded actuator position 226 and, based on this input, drives or controls helicopter cyclic roll actuator 206 to accordingly change position in response to commanded actuator position 226. In this instance, helicopter cyclic roll actuator 206 is coupled to rotor 104, and a change in helicopter cyclic roll actuator 206 position directly causes an attitude change about the longitudinal axis of rotor 104. In particular, servo motor 204 drives helicopter cyclic roll actuator 206, which in turn drives the control surface (i.e., rotor 104).

The aerodynamic forces that result from the control surface movement cause RC model helicopter 10 to change attitude. In particular, the attitude change about the longitudinal axis of rotor 104 affects helicopter dynamics 208 and, in particular, the roll attitude of RC model helicopter 10. Attitude sensor 210 generally functions to measure an attitude change and output a new or measured attitude. In this instance, attitude sensor 210 measures the roll attitude change and outputs measured roll attitude 220, which is used to generate roll attitude error 214 and roll attitude rate 216.

Differentiator 212 generally functions to generate an attitude rate from an input attitude measurement. For example and in this instance, differentiator 212 receives as input measured roll attitude 220 from attitude sensor 210 and generates roll attitude rate 216 by calculating the derivative of measured roll attitude 220. Roll attitude rate 216 is then provided as one input to roll attitude neural controller 202.

In one embodiment, servo motor 204, helicopter cyclic roll actuator 206, and attitude sensor 210 are housed within or as part of RC model helicopter 10 and roll attitude neural controller 202 is located external to RC model helicopter 10. For example, roll attitude neural controller 202 may be housed and execute within a computer. In this embodiment, roll attitude neural controller 202 can communicate with the components housed within RC model helicopter 10 either through wireless communication (e.g., radio communication, etc.) or via a physical connection. In another embodiment, roll attitude neural controller 202 is housed within or as part of RC model helicopter 10.

It is appreciated that the aforementioned components depicted in the neural network roll attitude control are only illustrative and the neural network roll attitude control may comprise other components and modules not depicted. The depicted components and modules may communicate with each other and other components comprising the neural network roll attitude control through mechanisms such as, by way of example, direct memory access, interprocess communication, procedure and function calls, application program interfaces, other various program interfaces, and various network and communication protocols. Furthermore, the functionality provided for in the components and modules may be combined into fewer components or modules or further separated into additional components or modules.

Figure 3:
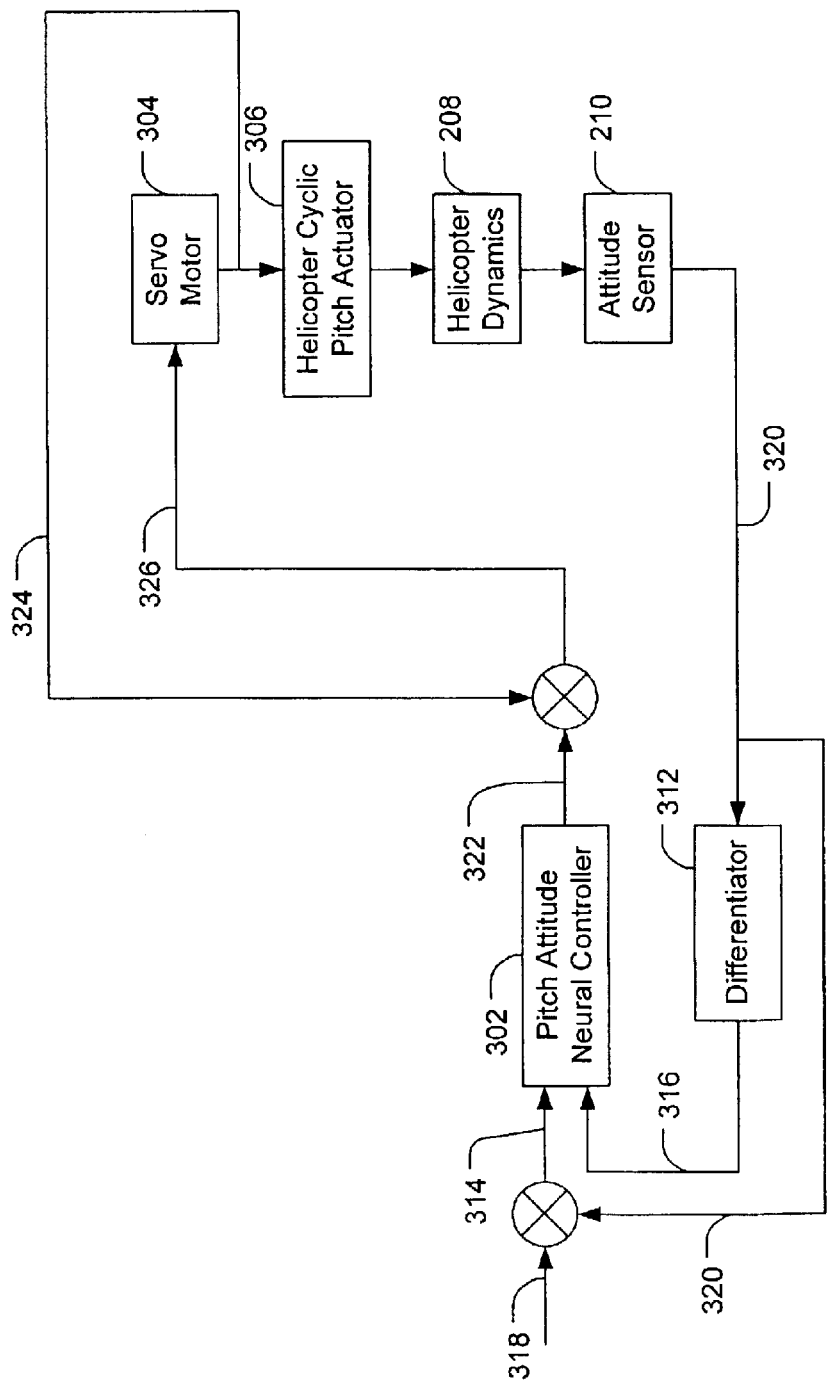
FIG. 3 illustrates a block diagram of one embodiment of a neural network pitch attitude control, according to the present invention.

FIG. 3 illustrates a block diagram of one embodiment of a neural network pitch attitude control, according to the present invention. As depicted, the neural network pitch attitude control comprises a pitch attitude neural controller 302, a servo motor 304, a helicopter cyclic pitch actuator 306, helicopter dynamics 208, attitude sensor 210, and a differentiator 312.

The neural network pitch attitude control generally functions to control the pitch axis of RC model helicopter 10 in a manner similar to that of the neural network roll attitude control disclosed above. In particular, pitch attitude neural controller 302 generally functions to control or maintain RC model helicopter 10 in a commanded pitch attitude. In one embodiment, pitch attitude neural controller 302 is a software implementation of a plurality of equations that define a neural network that is taught to reduce the pitch attitude error to zero.

Pitch attitude neural controller 302 receives as input a pitch attitude error 314 and a pitch attitude rate 316. Pitch attitude error 314 is the difference between a commanded pitch attitude 318 and a measured (actual) pitch attitude 320, and pitch attitude rate 316 is the derivative of measured pitch attitude 320. Pitch attitude neural controller 302 processes the inputs and generates a servo actuator rate command 322, which is an incremental delta position (negative or positive) that is applied to a current actuator position 324 to generate a commanded actuator position 326 to servo motor 304.

Servo motor 304 is coupled to helicopter cyclic pitch actuator 306 and generally functions to drive helicopter cyclic pitch actuator 306. Servo motor 304 receives as input commanded actuator position 326 and, based on this input, drives or controls helicopter cyclic pitch actuator 306 to accordingly change position in response to commanded actuator position 326. In this instance, helicopter cyclic pitch actuator 306 is coupled to rotor 104, and a change in helicopter cyclic pitch actuator 306 position directly causes a change in the attitude of rotor 104.

The change in the attitude of rotor 104 affects helicopter dynamics 208 and, in particular, the pitch attitude of RC model helicopter 10. Attitude sensor 210 measures the pitch attitude change and outputs measured pitch attitude 320, which is used to generate pitch attitude error 314 and pitch attitude rate 316. Differentiator 312 functions to receive as input measured pitch attitude 320 from attitude sensor 210 and generate pitch attitude rate 316 by calculating the derivative of measured pitch attitude 320. Pitch attitude rate 316 is then provided as one input to pitch attitude neural controller 302.

Figure 4:
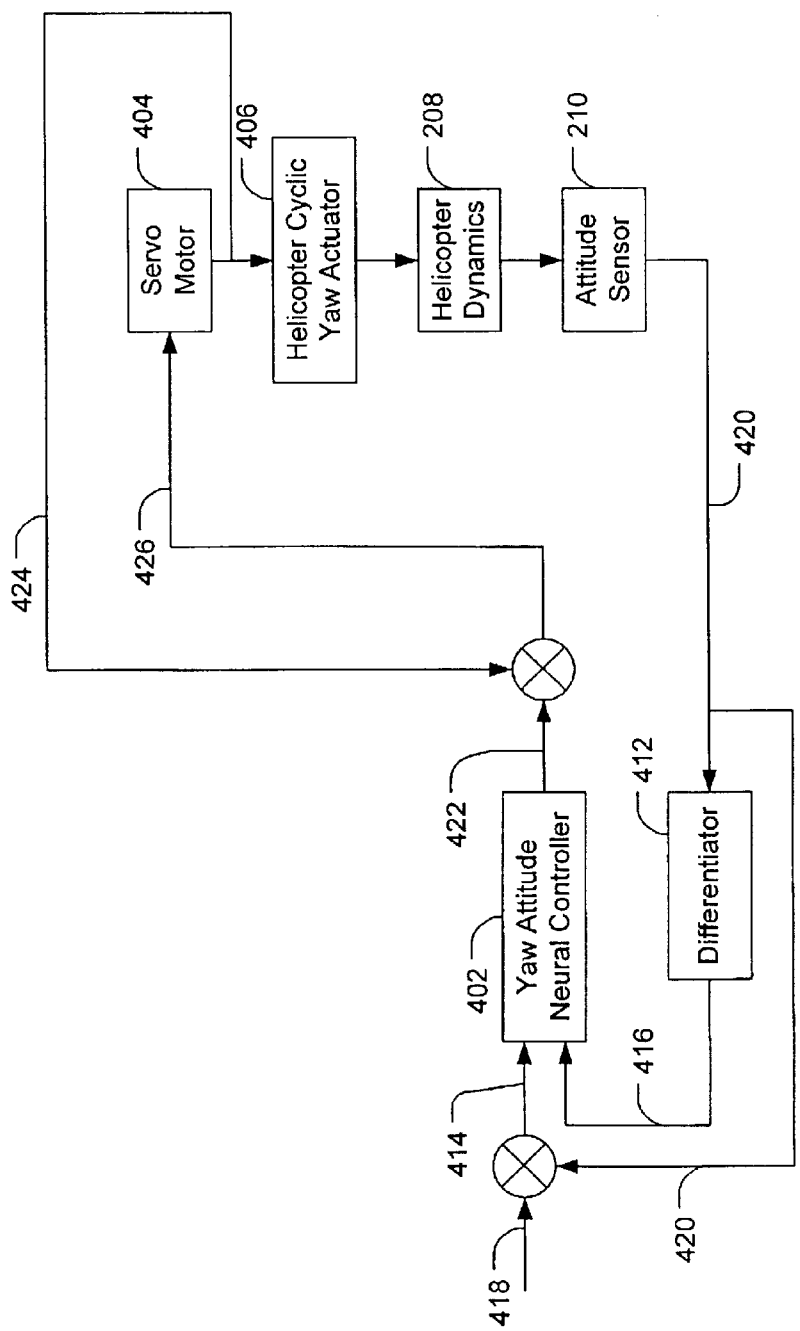
FIG. 4 illustrates a block diagram of one embodiment of a neural network yaw attitude control, according to the present invention.

FIG. 4 illustrates a block diagram of one embodiment of a neural network yaw attitude control, according to the present invention. As depicted, the neural network yaw attitude control comprises a yaw attitude neural controller 402, a servo motor 404, a helicopter cyclic yaw actuator 406, helicopter dynamics 208, attitude sensor 210, and a differentiator 412.

The neural network roll attitude control generally functions to control the yaw axis of RC model helicopter 10 in a manner similar to that of the neural network roll attitude control and the neural network pitch attitude control disclosed above. In particular, yaw attitude neural controller 402 generally functions to control or maintain RC model helicopter 10 in a commanded yaw attitude. In one embodiment, yaw attitude neural controller 402 is a software implementation of a plurality of equations that define a neural network that is taught to reduce the yaw attitude error to zero.

Yaw attitude neural controller 402 receives as input a yaw attitude error 414 and a yaw attitude rate 416. Yaw attitude error 414 is the difference between a commanded yaw attitude 418 and a measured (actual) yaw attitude 420, and yaw attitude rate 416 is the derivative of measured yaw attitude 420. Yaw attitude neural controller 402 processes the inputs and generates a servo actuator rate command 422, which is an incremental delta position (negative or positive) that is applied to a current actuator position 424 to generate a commanded actuator position 426 to servo motor 204.

Servo motor 404 is coupled to helicopter cyclic yaw actuator 406 and generally functions to drive helicopter cyclic yaw actuator 406. Servo motor 404 receives as input commanded actuator position 426 and, based on this input, drives or controls helicopter cyclic yaw actuator 406 to accordingly change position in response to commanded actuator position 426. In this instance, helicopter cyclic yaw actuator 406 is coupled to tail rotor 108, and a change in helicopter cyclic yaw actuator 406 position directly causes a change in the position of tail rotor 108.

The change in the attitude of tail rotor 108 affects helicopter dynamics 208 and, in particular, the yaw attitude of RC model helicopter 10. Attitude sensor 210 measures the yaw attitude change and outputs measured yaw attitude 420, which is used to generate yaw attitude error 414 and yaw attitude rate 416. Differentiator 412 functions to receive as input measured yaw attitude 420 from attitude sensor 210 and generate yaw attitude rate 416 by calculating the derivative of measured yaw attitude 420. Yaw attitude rate 416 is then provided as one input to yaw attitude neural controller 402.

As is conventionally known, artificial neural networks (also called neural networks) are networks of interconnected nodes (or processing elements) called neurons, which process signals transmitted along the connected pathways. Neural networks are crudely modeled after the human brain and are adept at "learning" multidimensional, nonlinear mathematical and "real world" physical relationships.

There are two main categories of neural networks: 1) supervised learning, and 2) unsupervised learning. In supervised learning, examples of desired behavior are used in the learning phase to "tell" the neural network how well it performs (called "reinforcement learning") or what the correct behavior would have been (called "fully supervised learning"). In unsupervised learning, the neural network operates in the learning mode without example data (i.e., it just looks at the data that is presented to it, discerns properties of the data set, and learns to classify the data (and similar data) according to these properties).

In one embodiment, supervised learning feed-forward neural networks are used to implement the neural controllers (roll attitude neural controller 202, pitch attitude neural controller 302, and yaw attitude neural controller 402) of the present invention. In other embodiments, other supervised learning and/or unsupervised learning neural networks may be utilized.

Numerical optimization of a usually nonlinear objective function can be performed to train the neural network. The "objective function" refers to a function that is being optimized, such as, by way of example, the error function which represents the sum of the differences between neural network output and example output over a given training set. Objective functions having continuous second derivatives are typical in feed-forward neural networks with the most popular differentiable activation functions and error functions.

For neural networks having a small number of weights, stabilized Newton and Guass-Newton algorithms, including various Levenberg-Marquardt and trust-region algorithms, are suitable to train the neural networks. For neural networks having a moderate number of weights, various quasi-Newton algorithms are suitable to train the neural networks. For neural networks having a large number of weights, various conjugate-gradient algorithms are suitable to train the neural networks.

In one embodiment, the Levenberg-Marquardt optimization method is utilized to train the neural networks. The Levenberg-Marquardt optimization method is adequate because the network architectures are relatively small (i.e., a small number of weights).

Fundamentally, neural networks are pattern recognition systems and are considered a form of artificial intelligence. As is conventionally known, primary applications are usually where few decisions are required from a massive amount of data and where a complex, nonlinear mapping is to be learned.

Figure 5:
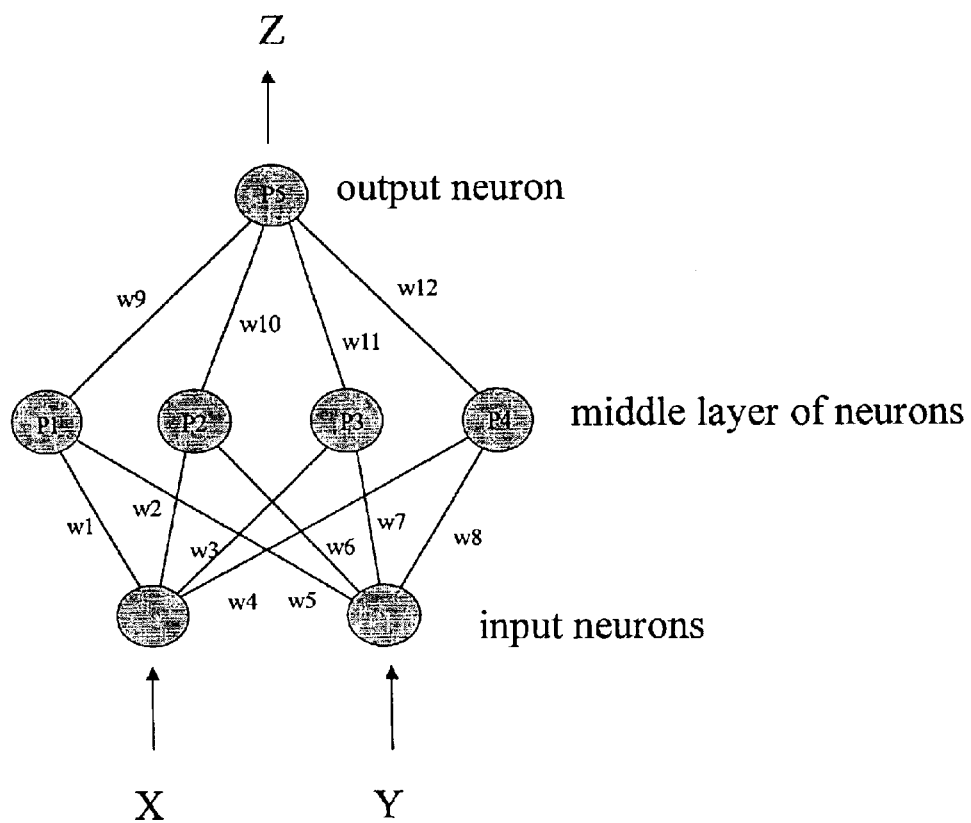
FIG. 5 illustrates an exemplary neural network for learning 3-dimensional relationships.

The objective, when using a neural network, is to find an optimum set of connection weights such that the network can: 1) correctly map a given set of inputs to the corresponding set of outputs, and 2) extrapolate beyond the training sets. A neural network can learn or map equations in 3-dimensional space. FIG. 5 illustrates an exemplary neural network for learning 3-dimensional relationships. As depicted in FIG. 5, the neural network comprises two inputs, X and Y, and one output, Z.

In the neural network depicted in FIG. 5, the independent variables are X and Y and the dependent variable is Z. A sinusoidal waveform with exponentially decreasing amplitude, which traverses, for example, the X-Y plane and has an amplitude in the Z-axis can represent a non-linear 3-dimensional curve to be learned by the neural network. The independent variables are in the X and Y axes (the two inputs to the neural network) and the dependent variable is in the Z-axis (the output of the neural network).

Each of the neurons of the neural network, not including the input elements, are processing elements. Each element processes signals that are received from elements in the previous layer of neurons. Processing elements (also called "activation functions" for the neurons in the middle and output layers) are utilized to introduce nonlinearity into the network.

Without nonlinearity, hidden units would probably not make neural networks more powerful than just plain "perceptrons" (an early form of neural network, which does not have any hidden units, just input and output units). The reason is that a composition of linear functions is again a linear function. However, it is the nonlinearity (i.e., the capability to represent nonlinear functions) that makes multilayer networks so powerful. Almost any nonlinear function does the job—the sigmoidal functions such as logistic and hyperbolic tangent (tanh) and the Gaussian function are the more common choices.

In one embodiment, the neural network structure is composed of hyperbolic tangent processing-element/activation-functions. For example, and as depicted in FIG. 5, neuron P1 processes all signals that traverse the w1 and w5 neural pathways. Input X is a signal that travels along path w1. This path has a gain or amplification value, which is represented by the value w1. Therefore, the value X is multiplied by w1 before being processed by neuron P1. In the same manner, the signal (input) Y is multiplied by w5 before being processed by the same neuron, P1.

The sum of all signal/gain products is processed by a hyperbolic tangent function. The result is the signal output by the processing element. The output signal of P1 can be represented mathematically by the following equation:

$$P1 = \text{TANH}((X*w1)+(Y*w5))$$

Likewise, the output signals for neurons P2, P3, P4 can also be represented mathematically by the following similar equations.

$$P2 = \text{TANH}((X*w2)+(Y*w6))$$

$$P3 = \text{TANH}((X*w3)+(Y*w7))$$

$$P4 = \text{TANH}((X*w4)+(Y*w8))$$

The output neuron processes all the signal/gain products of the previous layer of processing elements—the equation is shown below.

$$P5 = \text{TANH}((P1*w9)+(P2*w10)+(P3*w11)+(P4*w12))$$

The result of P5 is the output of the neural network. In other embodiments, any nonlinear function, such as, by way of example and not limitation, a logistic function, a Gaussian function, and the like, can be used to comprise the neural network structure.

Neural networks are highly adept at mapping complex, nonlinear mathematical as well as real world physical relationships. A neural network can "learn" to control a mechanism as complex as a helicopter, without any assistance from conventional control laws. The architecture of the neural network enables it to be adaptive and robust in nature. One technical advantage is that a neural control system can be designed which adapts and accommodates itself to the various changes in both airframe mass properties and airframe response characteristics.

Figure 6:
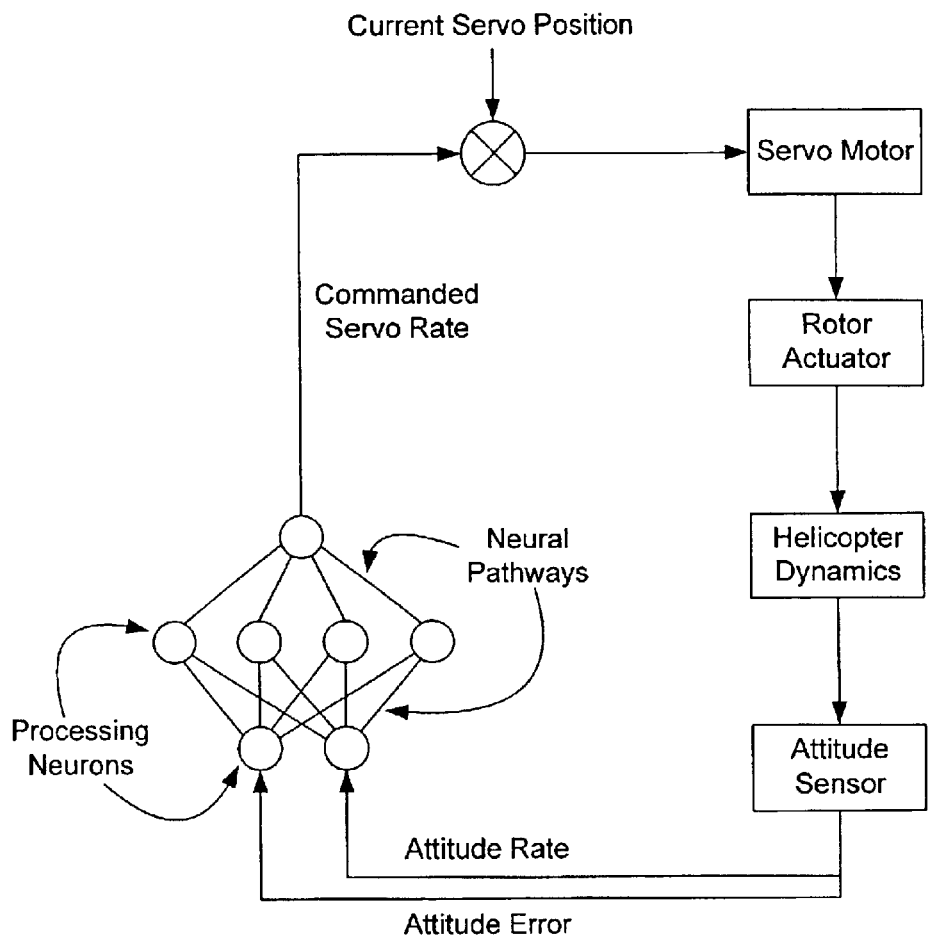
FIG. 6 illustrates a block diagram of one embodiment of an exemplary closed-loop process for a neural network helicopter attitude control, according to the present invention.

FIG. 6 illustrates a block diagram of one embodiment of an exemplary closed-loop process for a neural network helicopter attitude control, according to the present invention. A technical advantage of a neural controller is that the neural control modules receive inputs from an on-board attitude sensor and generate servo motor commands that will maintain the helicopter in a commanded attitude. As depicted in FIG. 6, the inputs to each neural controller comprise an attitude error for that particular axis, and an attitude rate for the same axis. The attitude error is the difference between a current measured attitude and a commanded attitude. The output is a servo motor rate, not the servo motor position. The servo motor is already at some position—the output of the neural controller module adds an incremental "delta position"(negative or positive) to the current servo motor position.

Figure 7:
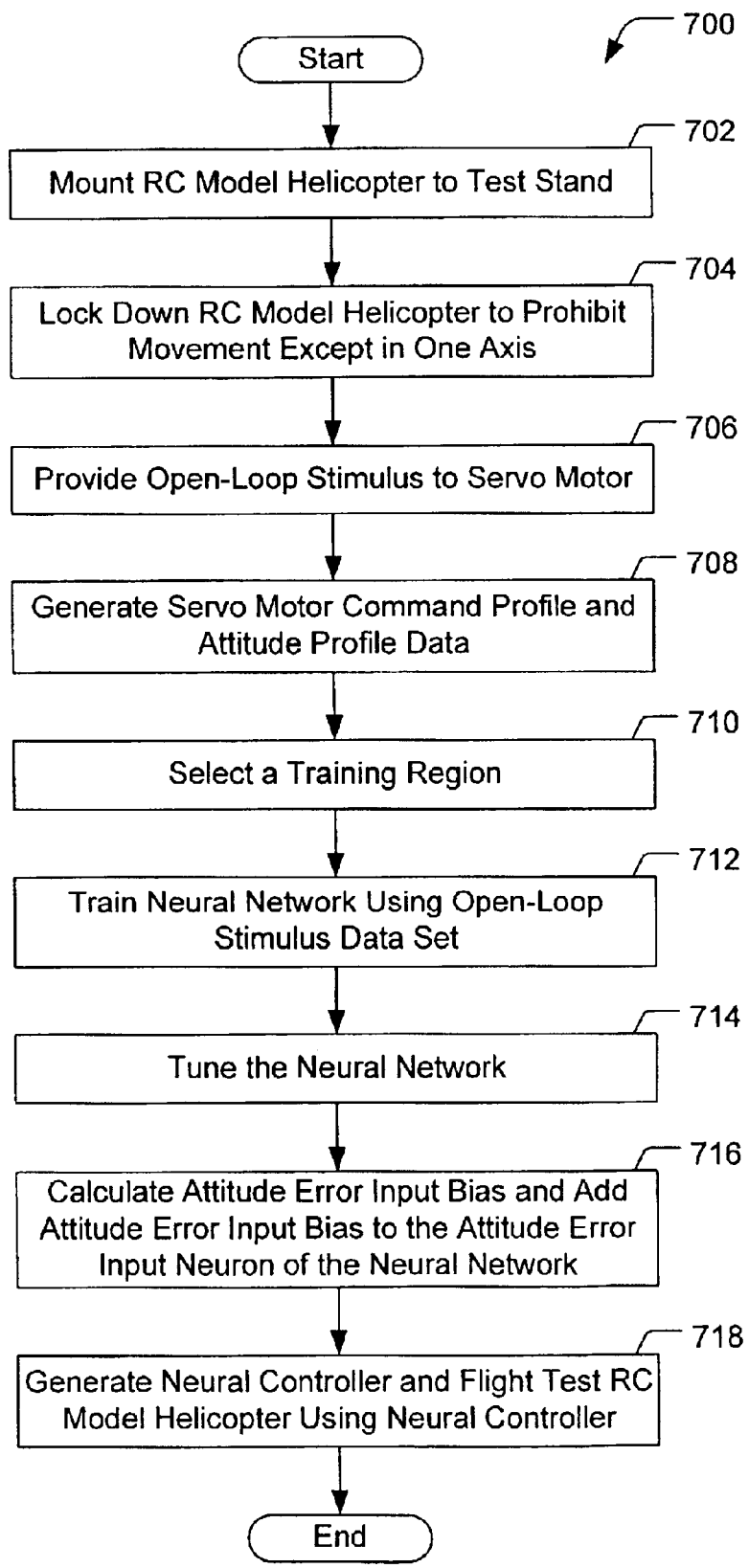
FIG. 7 illustrates a flow chart of one embodiment of a method by which a neural controller is developed, according to the present invention.

FIG. 7 illustrates a flow chart of one embodiment of a method 700 by which a neural controller is developed, according to the present invention. In particular, a neural network suitable for use in creating the neural controller is developed utilizing a test stand and using operator-induced open-loop stimulus. The neural network utilizes a sinusoidal waveform with exponentially decreasing amplitude as an example of a desired behavior from which to "learn" or "map" the inputs to outputs.

Method 700 will now be further disclosed in connection with developing a neural controller suitable for controlling RC model helicopter 10 in a commanded roll attitude (i.e., roll attitude neural controller 202). It is appreciated that the same or substantially similar techniques employed in method 700 can be utilized by a user (i.e., an operator) to develop a neural controller suitable for controlling RC model helicopter 10 in a command pitch attitude and yaw attitude (i.e., the other axes of motion).

Beginning at a start step, an operator mounts RC model helicopter 10 to test stand 20 at step 702. At step 704, the operator locks down RC model helicopter 10 to prohibit movement except in one axis. Stated another way, RC model helicopter 10 is configured on test stand 20 such that RC model helicopter 10 is free to move about the axis of motion being tested (i.e., the axis of interest) and unable to move about the other axes of motion.

For example, assuming that the operator is designing roll attitude neural controller 202, the operator will lock in place the pitch and yaw axes so as to allow movement only about the roll axis. Note that techniques for locking down a model aircraft mounted on a test stand for particular ranges of motion are generally known in the art and will not be described in detail herein.

Figure 8:
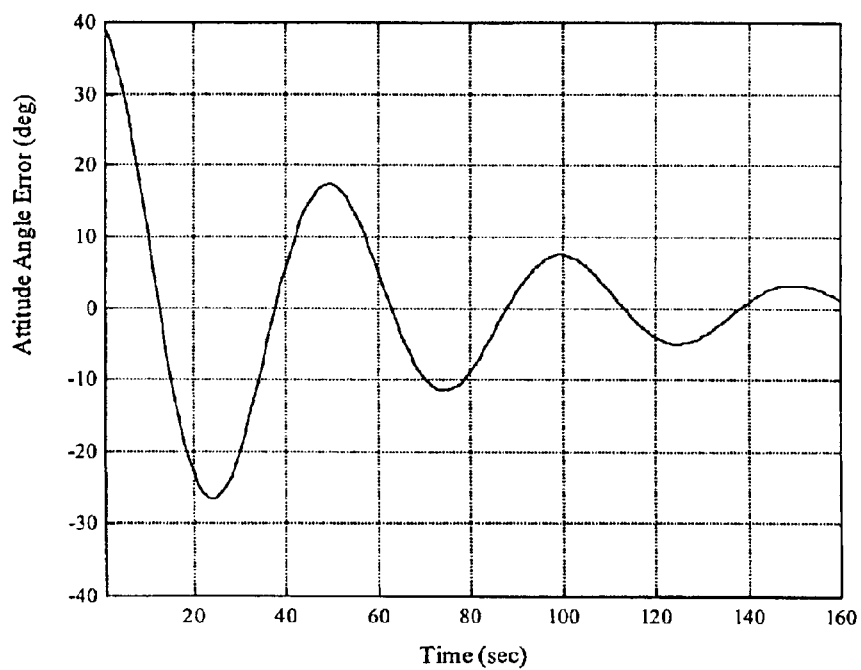
FIG. 8 illustrates an example of an operator-induced decaying sinusoidal wave stimulus.

At step 706, servo motor 204 is provided an open-loop stimulus. The open-loop stimulus causes RC model helicopter 10 to oscillate about its roll axis and serves as the example from which the neural network "learns" or "maps" the inputs to outputs. In one embodiment, the operator generates an exponentially decaying sinusoidal waveform that serves as the open-loop stimulus used to drive servo motor 204 for the axis of interest. FIG. 8 illustrates an example of an operator-induced decaying sinusoidal wave stimulus.

With RC model helicopter 10 mounted and balanced on test stand 20, servo motor 204 creates a typical transient response behavior in response to the input exponentially decaying sinusoidal waveform. This "teaches" the neural network that the objective is to reduce the attitude error to zero.

For example, in order to oscillate RC model helicopter 10 in a desired direction about the roll axis, servo motor 204 causes helicopter cyclic roll actuator 206 to tilt rotor 104 in a desired direction. The aerodynamic force generated by rotor 104 then cause RC model helicopter 10 to rotate, depending on the angle of tilt and the rotary speed of rotor 104, about the roll axis in the desired direction. In order to roll RC model helicopter 10 in the opposite direction about the roll axis, servo motor 204 causes helicopter cyclic roll actuator 206 to tilt rotor 104 in the opposite direction, and the aerodynamic force generated by rotor 104 causes RC model helicopter 10 to rotate about the roll axis in the opposite direction.

Providing servo motor 204 with a decaying sinusoidal control signal, as described above, causes helicopter cyclic roll actuator 206 to tilt rotor 104 back and forth from one side of a roll neutral position to the other side of the roll neutral position at progressively smaller cants or roll angles. In other words, servo motor 204 causes helicopter cyclic roll actuator 206 to tilt rotor 104 such that rotor 104 and RC model helicopter 10 oscillates about a roll neutral position.

Figure 9:
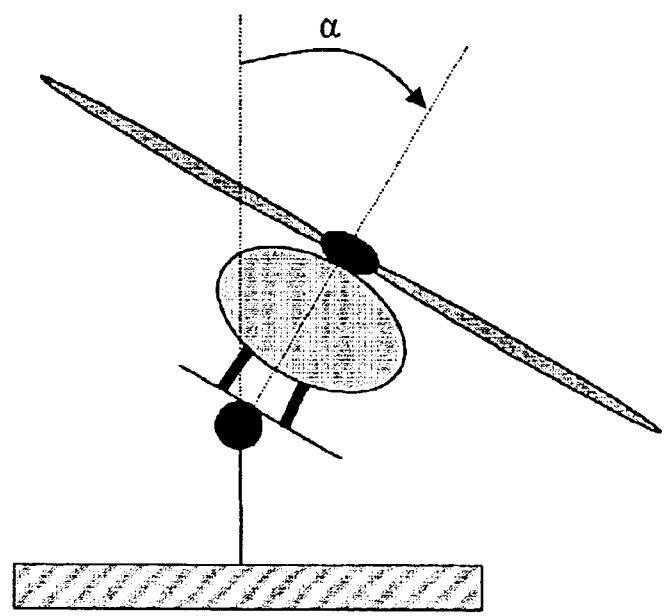
FIG. 9 illustrates a RC model helicopter mounted on a test stand and canted a positive α degrees from a roll neutral position.

Note that the "roll neutral position" is a position where the aerodynamic force generated by rotor 104 is substantially parallel to the helicopter's yaw axis when the helicopter is upright, and the "roll angle" is a measure of the angular displacement of rotor 104 from the roll neutral position. FIG. 9 illustrates RC model helicopter 10 mounted to test stand 20 and canted a positive a degrees from the roll neutral position.

In one embodiment, once mounted to test stand 20, RC model helicopter 10 can have a margin of approximately plus/minus 40 or so degrees (measured from zero degrees up), although other margin ranges may be employed, if desired. In the nominal, unpowered condition, RC model helicopter 10 will be canted either to one side of the roll neutral position or the other side of the roll neutral position, for example, as depicted in FIG. 9.

Figure 10:
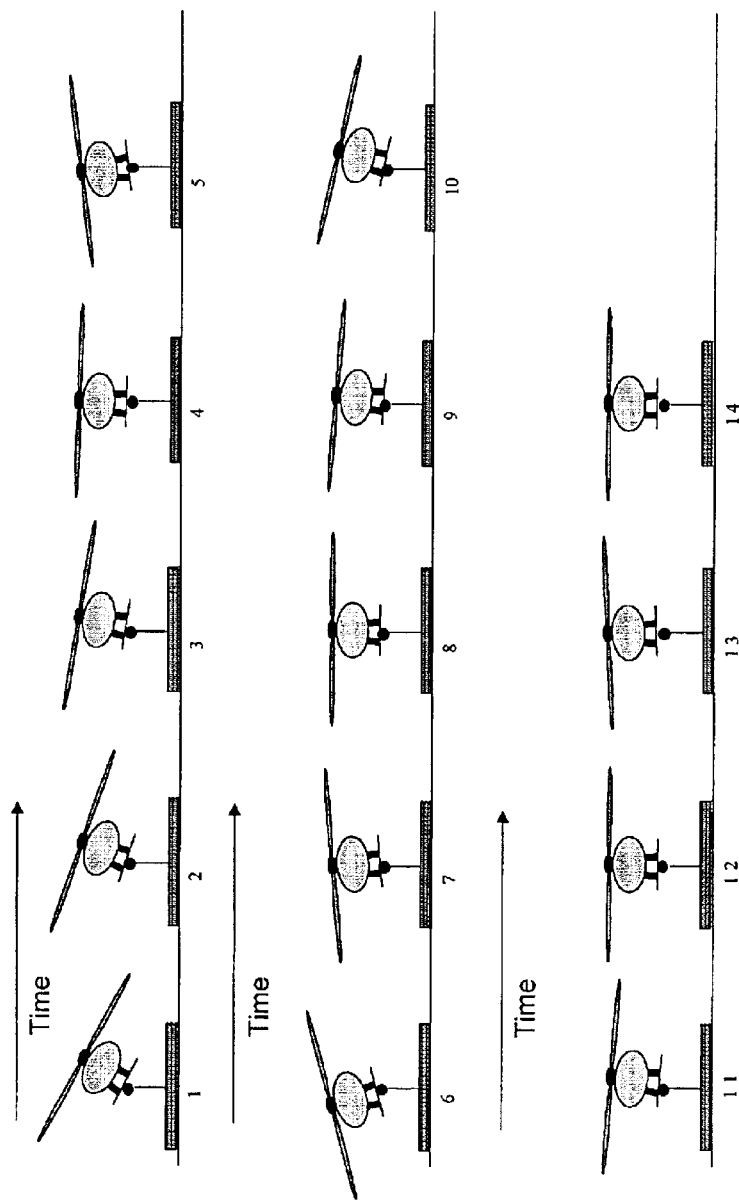
FIG. 10 illustrates an exemplary depiction of the effect of an exponentially decaying sinusoidal waveform on a RC model helicopter mounted to a test stand.

FIG. 10 illustrates an exemplary depiction of the effect of an exponentially decaying sinusoidal waveform on RC model helicopter 10 mounted to test stand 20. In particular, if viewed from left to right (going down), FIG. 10 depicts the sinusoidal motion of RC model helicopter 10 airframe (driven by rotor 104). Note that, in FIG. 10, the numbers refer to frame numbers and that the frame numbers are consecutive in that a frame with a higher frame number occurs later in time with respect to a frame having a lower frame number.

In frame 1, RC model helicopter 10 is at rest (i.e., rotor 104 is moving but the airframe is not moving). In frame 2, RC model helicopter 10 airframe begins to move. RC model helicopter 10 continues to upright itself, passes through the zero degree attitude mark (i.e., roll neutral position), and continues into a negative zone (frames 3 through 5). RC model helicopter 10 stops in the negative zone (frame 6) and begins moving back the other way. RC model helicopter 10 passes back through the zero degree attitude mark and stops at some point (frame 10). It moves back again towards the zero degree attitude mark, barely passes into the negative zone and then comes back close to or at the zero degree attitude mark.

Servo motor 204, in response to the input exponentially decaying sinusoidal waveform, causes helicopter cyclic roll actuator 206 to adjust the position of rotor 104 such that RC model helicopter 10 oscillates about the roll axis in the manner described above in conjunction with FIG. 10. This process of transitioning back and forth between opposite sides of the roll neutral position is repeated at progressively smaller roll angles (i.e., attitude errors) until the roll angle approaches zero.

In one embodiment, the neural network (i.e., roll attitude neural controller 202 developed from the neural network) emulates this behavior when controlling RC model helicopter 10. If there is an attitude error (e.g., frame 1), then roll attitude neural controller 202 manipulates rotor 104 such that RC model helicopter 10 attitude error decreases. It is appreciated that some degree of overshoot is expected, as shown in frames 5 through 7. Additional but smaller overshoot is shown in frames 9 through 11. Finally the attitude error is zeroed out as exemplified by frame 14.

Referring again to FIG. 7, a servo motor command profile and attitude profile data are generated at step 708. In one embodiment, while RC model helicopter 10 is oscillating, a computer is preferably capturing data indicative of RC model helicopter's 10 response to the open-loop stimulus (i.e., the servo motor command profile and attitude profile data). For example, attitude sensor 210 onboard RC model helicopter 10 measures various flight parameters, such as, by way of example and not limitation, RC model helicopter's 10 roll attitude. The computer coupled to and in communication with attitude sensor 210 samples and appropriately stores in memory each of the parameters measured by attitude sensor 210 as RC model helicopter 10 is oscillating in response to the open-loop stimulus.

Figure 11:
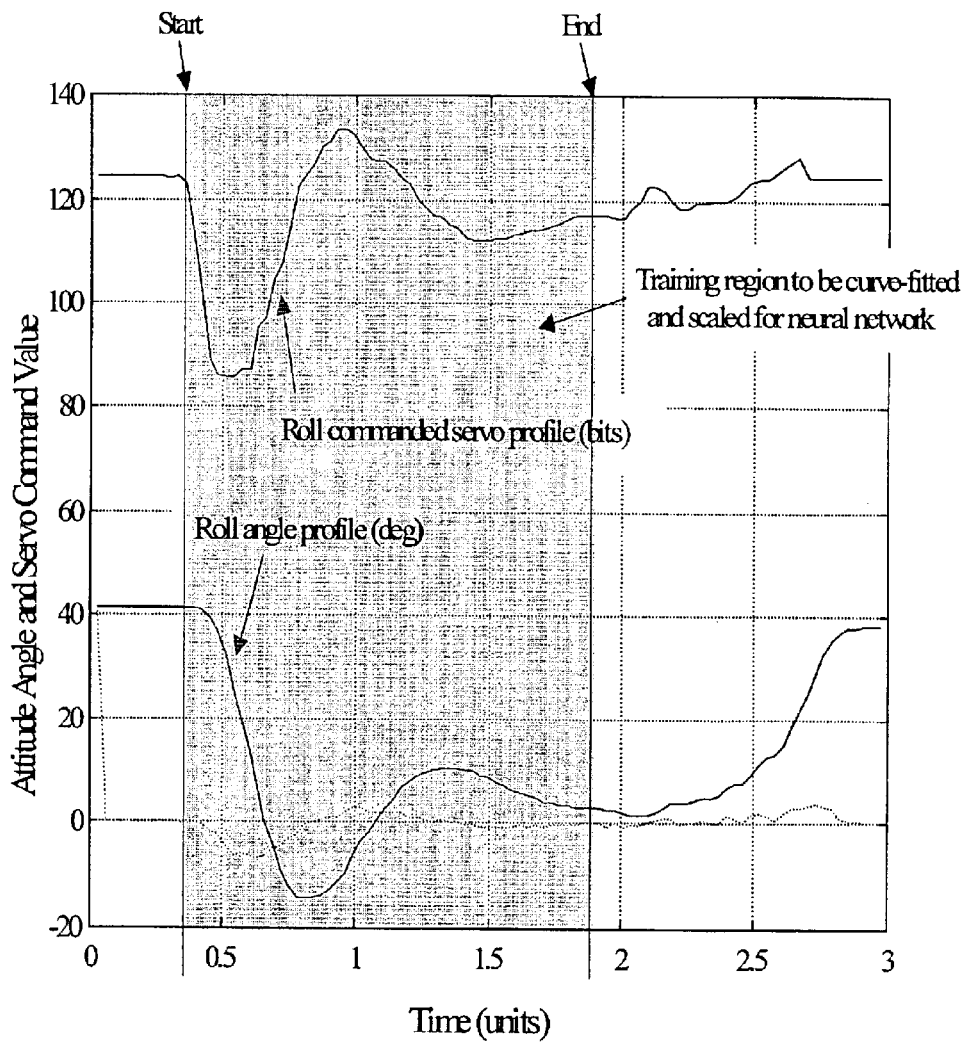
FIG. 11 illustrates an exemplary graphical depiction of a training region, according to the present invention.

At step 710, a training region is selected from the sampled parameters measured by attitude sensor 210. In one embodiment, the training region starts substantially at a beginning of a sinusoidal waveform and ends substantially at a point where the attitude and commanded servo profiles have very low rates. FIG. 11 illustrates an exemplary graphical depiction of a training region, according to the present invention.

The training region provides the foundation for training the neural network to zero out an attitude error. The training region is utilized to train the neural network to control the control surface of RC model helicopter 10 in free flight such that angular displacements of RC model helicopter 10 about the roll axis are "zeroed out." In particular, the training region teaches the neural network how to drive the error (i.e., the difference between a current attitude and a targeted attitude) to zero. Stated differently, the neural network is taught to return RC model helicopter 10 to an initial commanded position after displacement from the initial position in free flight.

Figure 12:
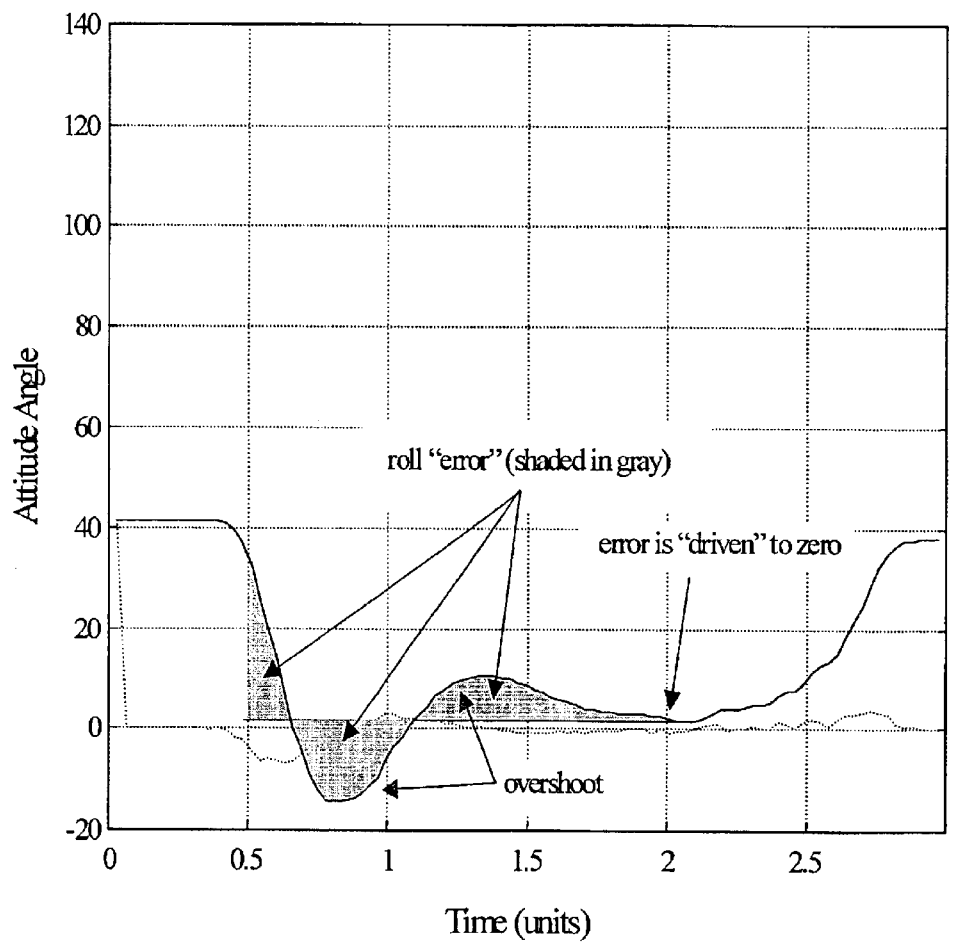
FIG. 12 illustrates an exemplary graphical depiction of a training region comprising two regions of overshoot, according to the present invention.

In one embodiment, the training region comprises two regions of overshoot, where each overshoot is in the opposite direction of the other. FIG. 12 illustrates an exemplary graphical depiction of a training region comprising two regions of overshoot, according to the present invention.

At step 712, a neural network is trained. In particular, the neural network is trained using the data from the selected training region. In one embodiment, the sampled parameters in the selected training region (i.e., the training data) is provided to the neural network training algorithm that is used to create a neural network based on the training data. The neural network, once trained how to map a given set of inputs to a desired output, can be implemented as a neural controller.

For example, RC model helicopter's 10 calculated roll attitude error and roll attitude rate data pair in the training data represent a possible set of inputs to the neural network, and the commanded servo actuator rate corresponding to the data pair represent the desired output of the neural network given the data pair as inputs. Utilizing the data in this manner, the neural network can be configured to map a set of actual flight inputs, comprising the roll attitude error and roll attitude rate data pairs, to an output representing the servo motor's rate command for the corresponding flight inputs.

In one embodiment, the attitude error and attitude rate is scaled to fit the input range of the neural network processing elements. This is where the neural network essentially learns the "desired" behavior. The objective of the neural network, and the resulting neural controller based on the neural network, is to zero out the attitude error as well as rate.

At step 714, the neural network is tuned to adjust for the differences in the response of RC model helicopter 10 about the roll axis when attached to test stand 20 and when in free flight. For example, the response of RC model helicopter 10 about the roll axis on the test stand is different than the response of RC model helicopter 10 about this axis in free flight. The major difference is that RC model helicopter 10 is almost like an inverted pendulum on test stand 20 (i.e., the neural controller is trying to keep RC model helicopter 10 upright). In free flight the reverse is true. That is, RC model helicopter 10 is "hanging" from the rotor, which is more like a pendulum effect. Therefore, some type of flight control tuning may be needed to adjust for the different response.

In one embodiment, a performance-shaping approach can be used to tune the neural controller during testing or in free flight. A technical advantage to using the performance-shaping methodology is that the performance-shaping methodology does not modify the structure of the neural controller in any way. Stated another way, the architecture of the neural network, and the gains or weights in the neural network, used to develop the neural controller are unchanged.

A performance-shaping methodology suitable for tuning the neural control was developed by J. Michael Fouche (inventor in this patent application) and generally described in a partially published Masters Thesis entitled "Artificial Neural Networks for the Control of Nonlinear Systems: Performance Shaping," submitted to the Graduate Engineering and Research School of Engineering, University of Dayton, May, 1996, in partial fulfillment of the requirements for the degree Master of Science in Mechanical Engineering by Michael Raphael Ried, the entirety of which is incorporated herein by reference.

Figure 13:
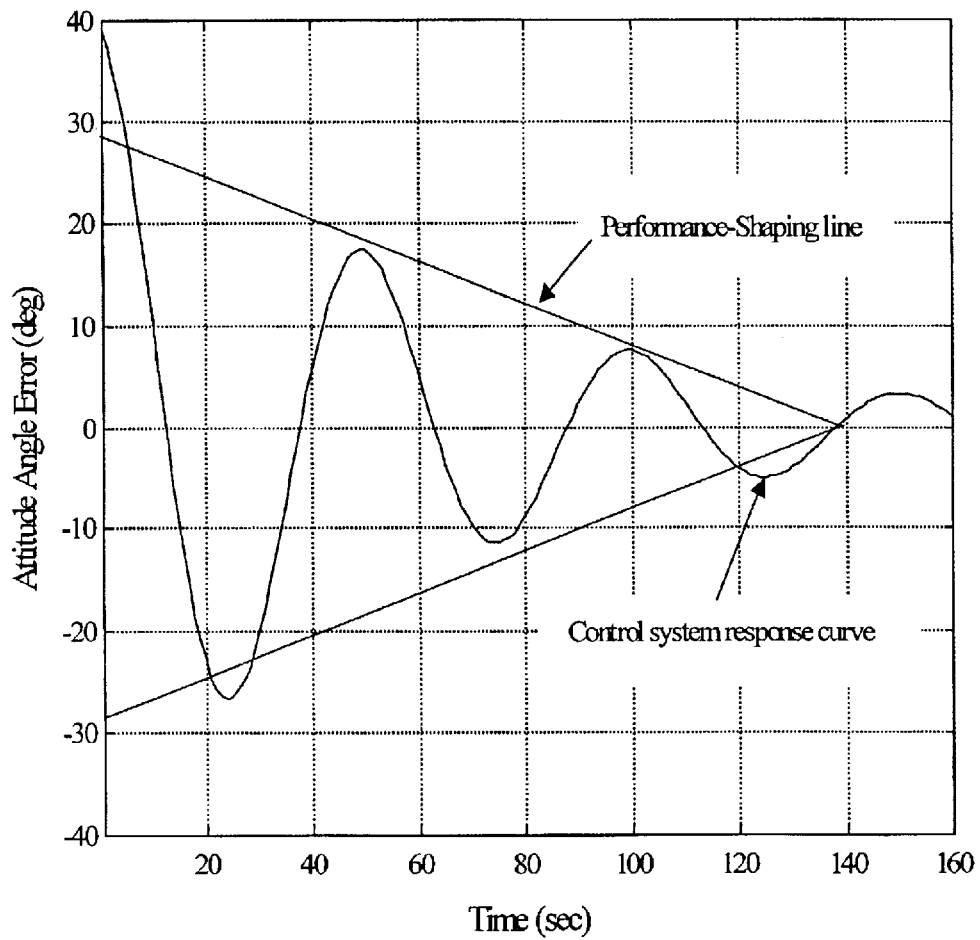
FIG. 13 illustrates an exemplary graphical depiction of an upper performance-shaping line and a lower performance-shaping line about a transient response curve, according to the present invention.

In general, the performance-shaping methodology comprises placing an "envelope" of two lines about the training region (i.e., transient response curve) selected in prior step 708. Stated another way, an upper performance-shaping line and a lower performance-shaping line are defined that generally envelope the attitude response defined by the entries within the training time period. The performance-shaping methodology "teaches" the neural network that the lines are determining approximately when the settling time of the transient response occurs. FIG. 13 illustrates an exemplary graphical depiction of an upper performance-shaping line and a lower performance-shaping line about a transient response curve, according to the present invention.

In one embodiment, and as depicted in FIG. 13, the upper performance-shaping line is defined such that it is generally close to the "crest" or local maxima of each oscillation period, and the lower performance-shaping line is defined such that it is generally close to the "trough" or local minima of each oscillation period. In other words, the upper and lower performance-shaping lines are fit to the response curve such that the two lines generally envelope the response curve and intersect at the end of the training period.

Use of the performance-shaping lines modifies the nominal neural controller architecture to have two additional inputs to the neural network. The additional inputs are provided as constants that represent the upper and lower performance-shaping lines. In one embodiment, the operator selects a value for the constant representing the upper performance-shaping line to be the value of the upper performance-shaping line at a particular time (e.g., t=0) and a value for the constant representing the lower performance-shaping line to be the value of the lower performance-shaping line at the particular time (e.g., t=0). These constants, referred to hereafter as "performance-shaping constants," are stored and used along with the attitude errors and attitude rates to tune the neural controller.

In another embodiment, an apparatus, such as, by way of example, a conventional data analyzer, can be used to determine and provide the values for the performance-shaping constants from the selected training region. In still another embodiment, the operator may arbitrarily select the values for the performance-shaping constants.

A technical advantage of the approach lies in the ability to increase or decrease the constants' values. For example, increasing the constants' values (opening up the envelope) conveys to the neural network that the objective is to increase the settling time (doesn't dampen out the oscillatory behavior as quickly). On the other hand, decreasing the constants' values (contracting the envelope) drives the neural network to decrease the settling time (dampens out the oscillatory behavior more quickly).

Figure 14:
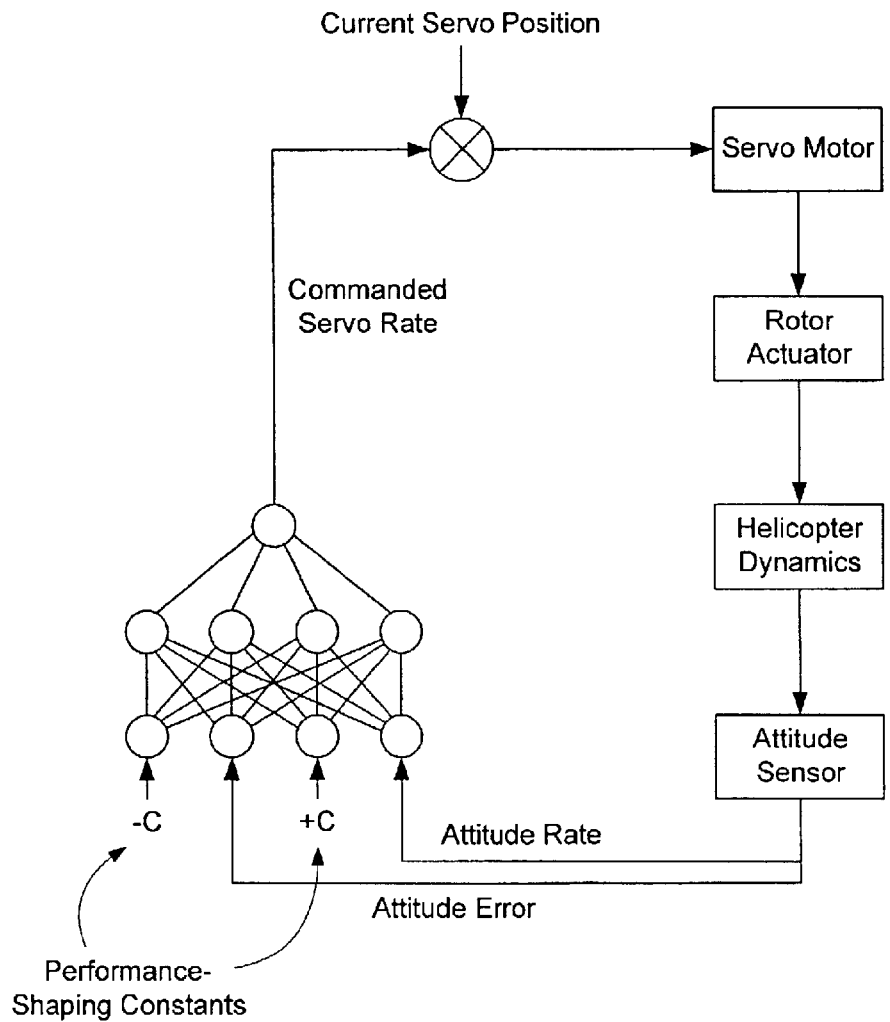
FIG. 14 illustrates a block diagram of one embodiment of an exemplary closed-loop process for a neural network having a neural controller tuning concept, according to the present invention.

FIG. 14 illustrates a block diagram of one embodiment of an exemplary closed-loop process for a neural network having a performance-shaping concept, according to the present invention. As illustrated, along with the attitude error and attitude rate data pair, a constant representing the upper performance-shaping line and a constant representing the lower performance-shaping line (collectively known as an "input training set") are input into the neural network to generate the commanded servo actuator rate that results from the values comprising the input training set. It is to be noted that the four input values are values that represent its respective constituent of the input training set (i.e., attitude error, attitude rate, upper performance-shaping constant, and lower performance-shaping constant) at substantially the same instance in time.

For example, with reference to the roll attitude, during a free flight test, roll attitude neural controller 202 receives as input RC model helicopter's 10 roll attitude error and roll attitude rate, as measured by attitude sensor 210. Roll attitude neural controller 202 also utilizes the two performance-shaping constants provided by the operator as inputs. Roll attitude neural controller 202 then maps these four inputs comprising the input training set to a commanded servo rate, as trained.

The commanded servo rate is further processed to produce a position command by multiplying the commanded servo rate with a delta-time value. The resulting position command is input to servo motor 204, which causes servo motor 204 to adjust the position of helicopter cyclic roll actuator 206 based on the position command. This causes helicopter dynamics 208 to change, and the change is detected and measured by attitude sensor 210. Roll attitude neural controller 202 maps the newly measured roll attitude error and roll attitude rate, along with the corresponding performance-shaping constants previously provided by the operator to a corresponding commanded servo rate This process is repeated during the flight test to tune roll attitude neural controller 202. FIG. 15 is a table illustrating an exemplary mapping between a plurality of input training sets for RC model helicopter 10 roll attitude and its corresponding commanded servo rate, according to the present invention.

If RC model helicopter 10 fails to perform in a stable or a desired manner, the operator can tune the neural controller by adjusting the performance-shaping constants in an effort to achieve stability or better performance. For example, increasing the magnitudes of the constant values generally "loosens" the response of RC model helicopter 10 such that angular displacements are zeroed out over longer periods of time, and decreasing the magnitudes of the constant values generally "tightens" the response of RC model helicopter 10 such that angular displacements are zeroed out over shorter periods of time.

If the operator determines that the dampening exhibited by RC model helicopter 10 is too high, the operator can increase the magnitude of the performance-shaping constants (i.e., provide higher values for the performance-shaping constants). In response, the neural controller uses the higher magnitude performance-shaping constants, along with the calculated attitude error and attitude rate, to determine a resulting commanded servo rate. In mapping such inputs to an output, as trained, the neural controller automatically adjusts the response of RC model helicopter 10 such that angular displacements are zeroed out more quickly.

In contrast, if the operator determines that the dampening exhibited RC model helicopter 10 is too low, the operator can decrease the magnitude of the performance-shaping constants (i.e., provide higher values for the performance-shaping constants). In response, the neural controller uses the lower magnitude performance-shaping constants, along with the calculated attitude error and attitude rate, to determine a resulting commanded servo rate. In mapping such inputs to an output, as trained, the neural controller automatically adjusts the response of RC model helicopter 10 such that angular displacements are zeroed out more slowly (i.e., over a longer period of time).

Referring again to FIG. 7, an attitude error input bias is calculated and added to an attitude error input neuron of the neural network at step 716. In particular, adding an attitude error input bias to the attitude error input neuron causes the output of the neural network (i.e., commanded servo rate) to converge or go to zero when zero error (i.e., attitude error =0) is input to the neural network.

For example, one objective, when creating the input training sets and the corresponding commanded servo rates, is to train the neural network to become a neural controller that dampens out and eliminates attitude errors and attitude rates (i.e., drive both variables to zero). As part of this process, it is desirable to show that, when the target attitude is achieved, the servo motor rate also goes to zero. In other words, the attitude error, attitude rate, and commanded servo rate converge to zero at substantially the same time.

One potential problem with the telemetry data (i.e., the attitude error measured by the sensor) is that the servo may still be slightly moving even though it's not affecting the profile. In addition, the curve fitting process (i.e., the original selected training data is curve-fitted) may add some residual servo rate. Thus, it may be desirable to find an attitude error input bias such that when combined with a zero attitude rate, the neural network will generate a zero commanded servo rate.

In one embodiment, an attitude error input bias can be calculated iteratively by using, for example, the Newton-Raphson bisection method. The Newton-Raphson bisection method is generally known to those of skill in the art and will not be explained in detail herein. In this regard, a large attitude error and zero attitude rate value are input into the already trained neural network. The resulting output of the neural network is used to determine an amount with which to modify (and in what direction) the attitude error input. This can be performed iteratively using the "bisection" method until a zero neural network output is achieved. The attitude error input bias is the value of attitude input that is needed to achieve the zero output value. Thus, if a zero attitude error is summed with the attitude error input bias, it is guaranteed that the output of the neural network (neural controller) will also be zero. A bias is not needed for the attitude rate input to the neural network.

By way of example, an equation for the inputs to the neural network can be as follows:

Neural_Network_1=(roll−roll_target)+nnet_roll_bias

Neural_Network_Input_2=roll_rate

Neural_Network_Input_1 and Neural_Network_Input_2 are the two input neurons of the neural network, and nnet_roll_bias is the roll attitude error input bias. The appropriate roll attitude error input bias (i.e., one that will provide a zero output) can be found by using the aforementioned bisection method to iterate on a roll attitude error input bias (using some bounded interval) until a predetermined tolerance threshold is met.

In the aforementioned algorithm, the inputs are roll=0, roll_target=0, and roll_rate=0. Therefore, Neural_Network_Input_1=(0−0)+nnet_roll_bias, Neural_Network_Input_2=0, and Output=some non-zero value. The roll attitude error input bias is then modified to decrease the output value. This calculation process is performed iteratively until the target roll attitude has been achieved (the attitude error is zero) and the neural controller should not issue any control commands other than zero (i.e., Output=0). FIG. 16 is a table illustrating exemplary chronological results of an iterative roll attitude error input bias calculation for a RC model helicopter, according to the present invention.

At step 718, the neural network is used to generate a neural controller and RC model helicopter 10 is flight tested using the neural controller. The neural controller is generally composed of the mathematical equations that form the neural network and is implemented as one or more software programs. RC model helicopter 10 is flight tested to determine if the neural controller is able to successfully move RC model helicopter 10 to a target roll attitude. If RC model helicopter 10 fails to perform in a stable or desired manner, the operator can tune the neural controller by adjusting the performance-shaping constants and/or the attitude error input bias in the neural network, and redevelop the neural controller from the neural network.

In one embodiment, RC model helicopter 10 is tested on test stand 20. In another embodiment, RC model helicopter 10 can be tested in free flight.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

It is appreciated that similar techniques as disclosed herein may be employed to train a neural network suitable for developing a neural controller to control RC model helicopter's 10 motions about one or more of the other axes (i.e., pitch and yaw axes). Furthermore, the results of training the neural network for one axis of motion (e.g., roll) may be utilized to train a neural network for another axis of motion (e.g., pitch). For example, the neural controller developed to control the roll of RC model helicopter 10 may be trained to control the pitch of RC model helicopter 10 according to the methodology disclosed herein and based on substantially the same training set. However, depending on the flight characteristics of RC model helicopter 10, the response for the pitch may need to be different than the response for the roll. This may be taken into account by allowing the operator to enter a different set of performance-shaping constants for the pitch. Thus, the operator may separately tune RC model helicopter 10 about the roll and pitch axes in order to achieve the desired stability for both roll and pitch.

While certain embodiments of the invention have been described, these embodiments have been presented by way of example only, and are not intended to limit the scope of the present invention. Accordingly, this invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method for controlling an aircraft comprising:
providing an attitude error as a first input into a neural controller, the attitude error calculated from a commanded attitude and a current measured attitude;
providing an attitude rate as a second input into a neural controller, the attitude rate derived from the current measured attitude;
processing the first input and the second input to generate a commanded servo actuator rate as an output of the neural controller;
generating a commanded actuator position from the commanded servo actuator rate and a current servo position; and
inputting the commanded actuator position to a servo motor configured to drive an attitude actuator to the commanded actuator position;
wherein, the neural controller is developed from a neural network, the neural network designed without using conventional control laws, the neural network trained to eliminate the attitude error.

2. The method of claim 1, wherein the commanded attitude, current measured attitude, attitude error, and attitude rate is a commanded roll attitude, a current measured roll attitude, a roll attitude error, and a roll attitude rate, respectively.

3. The method of claim 1, wherein the commanded attitude, current measured attitude, attitude error, and attitude rate is a commanded pitch attitude, a current measured pitch attitude, a pitch attitude error, and a pitch attitude rate, respectively.

4. The method of claim 1, wherein the commanded attitude, current measured attitude, attitude error, and attitude rate is a commanded yaw attitude, a current measured yaw attitude, a yaw attitude error, and a yaw attitude rate, respectively.

5. The method of claim 1, wherein the current measured attitude is provided by an attitude sensor on-board the aircraft.

6. The method of claim 1, wherein the aircraft is a remote controlled aircraft.

7. The method of claim 1, wherein the aircraft is a fixed-wing aircraft.

8. The method of claim 1, wherein the aircraft is a rotary-winged aircraft.

9. The method of claim 1, wherein the neural network is trained to eliminate the attitude error via a method comprising:
providing an open-loop stimulus to the aircraft, the open-loop stimulus causes the aircraft to oscillate about a free axis;
capturing data indicative of the aircraft's response to the open-loop stimulus;
selecting a training region from the captured data; and
using the training region to train the neural network to eliminate the attitude error.

10. The method of claim 9, wherein the open-loop stimulus is an exponentially decaying sinusoidal waveform.

11. The method of claim 9, wherein the open-loop stimulus is provided by an operator.

12. The method of claim 9 further comprising mounting the aircraft on a test stand.

13. The method of claim 9 further comprising providing a computer coupled to the aircraft, the computer operable to capture data indicative of the aircraft's response to the open-loop stimulus.

14. The method of claim 9, wherein the training region starts substantially at a beginning of a sinusoidal waveform and ends substantially at a point where an attitude and a commanded servo profile have very low rates.

15. The method of claim 9, wherein the training region comprises at least two regions of overshoot.

16. The method of claim 9 further comprising tuning the neural controller by providing a first performance-shaping constant as a third input to the neural controller and a second performance-shaping constant as a fourth input to the neural controller, the first performance-shaping constant determined from an upper performance-shaping line and the second performance-shaping constant determined from a lower performance-shaping line, wherein the upper and lower performance-shaping lines envelope the training region.

17. The method of claim 1 further comprising:

calculating an attitude error input bias; and adding the attitude error input bias to the attitude error;

wherein adding the attitude error input bias to the attitude error causes the output of the neural controller to converge to zero when the attitude error is zero.

18. The method of claim 17, wherein the attitude error input bias is calculated using the Newton-Raphson bisection method.

19. An apparatus for controlling an aircraft comprising:

an attitude sensor operable to provide a current attitude;

a differentiator operable to receive as input the current attitude and derive an attitude rate;

a neural controller operable to receive a plurality of inputs comprising an attitude error and the attitude rate, the attitude error calculated from a commanded attitude and the current attitude, the neural controller also operable to generate a commanded servo rate from the plurality of inputs, the commanded servo rate applied to a current actuator position to generate a commanded actuator position; and a servo motor operable receive the commanded actuator position, the servo motor further operable to drive an attitude actuator to the commanded actuator position;

wherein the neural controller is developed from a neural network designed without using conventional control laws.

20. The apparatus of claim 19, wherein the current attitude is a roll attitude.

21. The apparatus of claim 19, wherein the current attitude is a pitch attitude.

22. The apparatus of claim 19, wherein the current attitude is a yaw attitude.

23. The apparatus of claim 19, wherein the neural network is trained via a method comprising:

mounting the aircraft on a test stand;

providing an open-loop stimulus to the aircraft, the open-loop stimulus causes the aircraft to oscillate about a free axis;

capturing data indicative of the aircraft's response to the open-loop stimulus;

selecting a training region from the captured data; and using the training region to train the neural network to eliminate the attitude error.

24. The apparatus of claim 23, wherein the open-loop stimulus is an exponentially decaying sinusoidal waveform.

25. The apparatus of claim 23, wherein the training region starts substantially at a beginning of a sinusoidal waveform and ends substantially at a point where an attitude and a commanded servo profile have very low rates.

26. The apparatus of claim 19, wherein the plurality of inputs to the neural controller further comprise a first constant and a second constant, wherein the first constant and the second constant affect an oscillatory behavior of the aircraft and are used to tune the neural controller.

27. The apparatus of claim 26, wherein the first constant is a value on an upper performance-shaping line and the second constant is a value on a lower performance-shaping line, the upper and lower performance-shaping lines envelope an exponentially decaying sinusoidal waveform used to train the neural network.

28. The apparatus of claim 19 further comprising an attitude error input bias, wherein the neural controller is further operable to receive as input a sum of the attitude error input bias and the attitude error to generate the commanded servo rate.

* * * * *